SIGNAL STORAGE DEVICES WITH CORRECTION MEANS

Filed Dec. 20, 1957 2 Sheets-Sheet 1

INVENTOR
Gerhard Dirks

BY Michael S. Striker
ATTORNEY

INVENTOR
Gerhard Dirks
BY Michael S. Striker
INVENTOR

United States Patent Office
3,011,154
Patented Nov. 28, 1961

3,011,154
SIGNAL STORAGE DEVICES WITH CORRECTION MEANS

Gerhard Dirks, 44 Morfelder Landstrasse, Frankfurt am Main, Germany

Filed Dec. 20, 1957, Ser. No. 704,136
Claims priority, application Great Britain Dec. 29, 1956
17 Claims. (Cl. 340—172.5)

Figure 1:
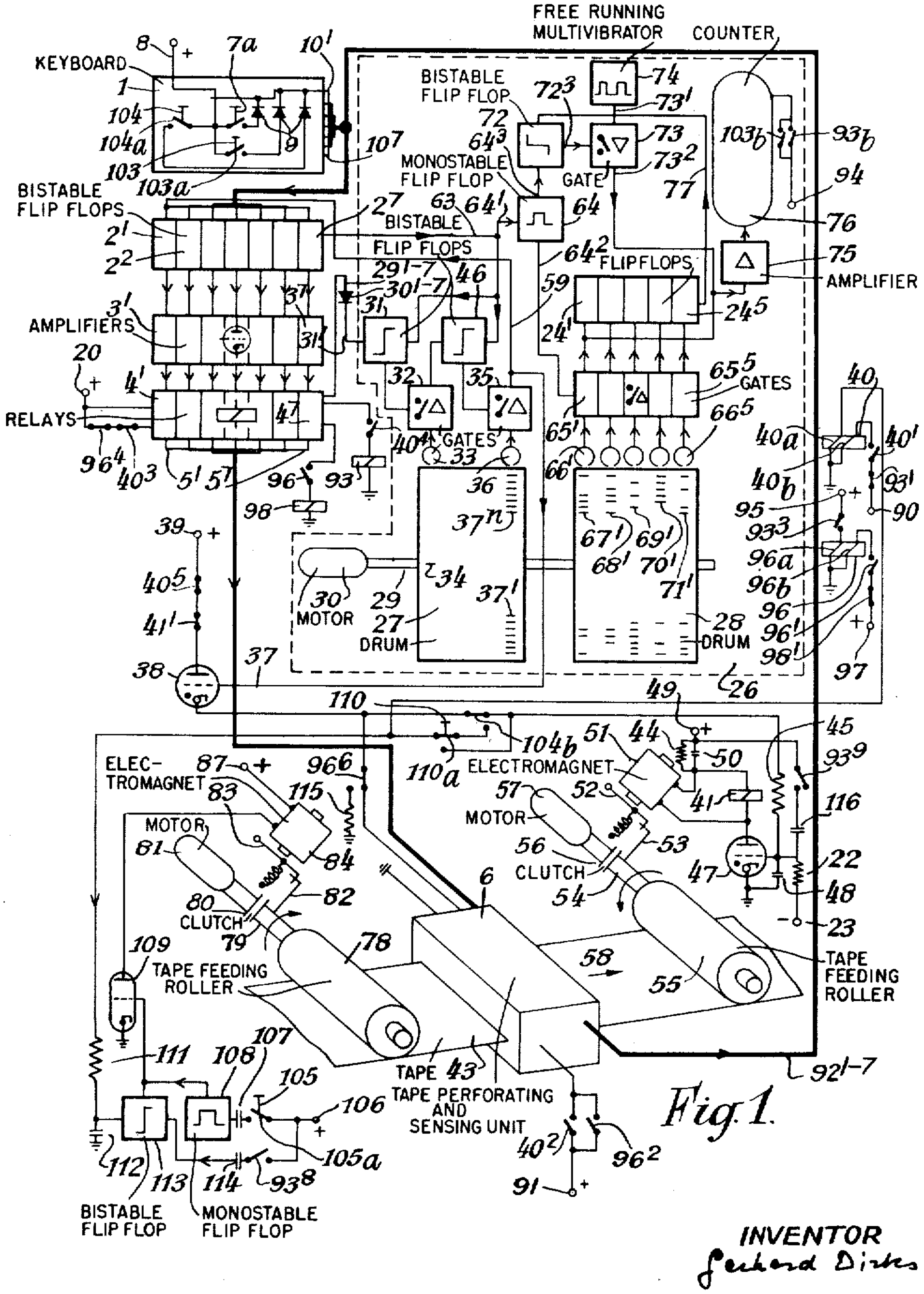

This invention relates to signal storage apparatus with provision for correcting erroneous entries therein.

In some cases in which data representing signals are stored, each stored data item has a subsidiary item of information associated therewith. For example, in the production of lines of justified type by means of a line composing machine or justifying typewriter, each type character has a particular character width associated with it. The characters forming a line to be justified may be stored as coded signal representations on a paper or magnetic tape, or a magnetic drum storage device, for example. The character widths associated with the character of such a line must also be stored in order to determine the correct justification factor for the line. If one or more stored characters is or are incorrect and they are subsequently corrected, the character widths must be corrected in a corresponding manner.

It is an object of the present invention to provide an arrangement in which subsidiary items associated with individual stored data items are automatically corrected when such stored items are corrected.

It is a further object of the invention to provide an arrangement in which a counter is advanced each time a data item is stored and in which the registration of the counter is automatically corrected when a correction is made to the stored items.

According to one feature of the invention apparatus for correcting stored signals representing subsidiary items corresponding to data items recorded sequentially, comprises means for generating signals representing the corresponding subsidiary item as each data item is recorded, a subsidiary item storage device for registering said signals, means for indicating a recorded data item which is to be corrected, means for sensing the recorded data items, means for rendering the signal generating means responsive to the sensed data items, and means for terminating said sequential sensing on detection of the indicated item, whereby the registration of the storage device is corrected to correspond to data items recorded prior to the indicated item.

According to another feature of the invention apparatus for correcting stored signals representing subsidiary items corresponding to data items recorded sequentially in groups separated by marker signals, comprises means for generating signals representing the corresponding subsidiary item as each data item is recorded, a subsidiary item storage device for registering said signals, means for indicating a recorded data item which is to be corrected, means for sensing the recorded data items, means for resetting the storage device as each marker signal is recorded, means for rendering the signal generating means operative in response to the sensed data items, and means for terminating said sequential sensing on detection of the indicated item, whereby the registration of the storage device is corrected to correspond to data items recorded between the last marker signal and the indicated item.

According to a further feature of the invention apparatus for correcting stored signals representing subsidiary items corresponding to data items recorded sequentially on a tape, the items being recorded in groups separated by marker signals, comprises means for generating signals representing the corresponding subsidiary item as each data item is recorded, a subsidiary item data storage device for registering said signals, means for indicating a recorded data item which is to be corrected, means for initiating a first sensing of the data items in the reverse order, means for detecting a marker signal and adapted to terminate said sensing and to initiate a second sensing of the data items in the sequence in which they were recorded, means for detecting the indicated item and operable to terminate said second sensing, means for rendering the signal generating means responsive to data items sensed during said second sensing and means operable to reset the storage device prior to said second sensing.

Figure 2:
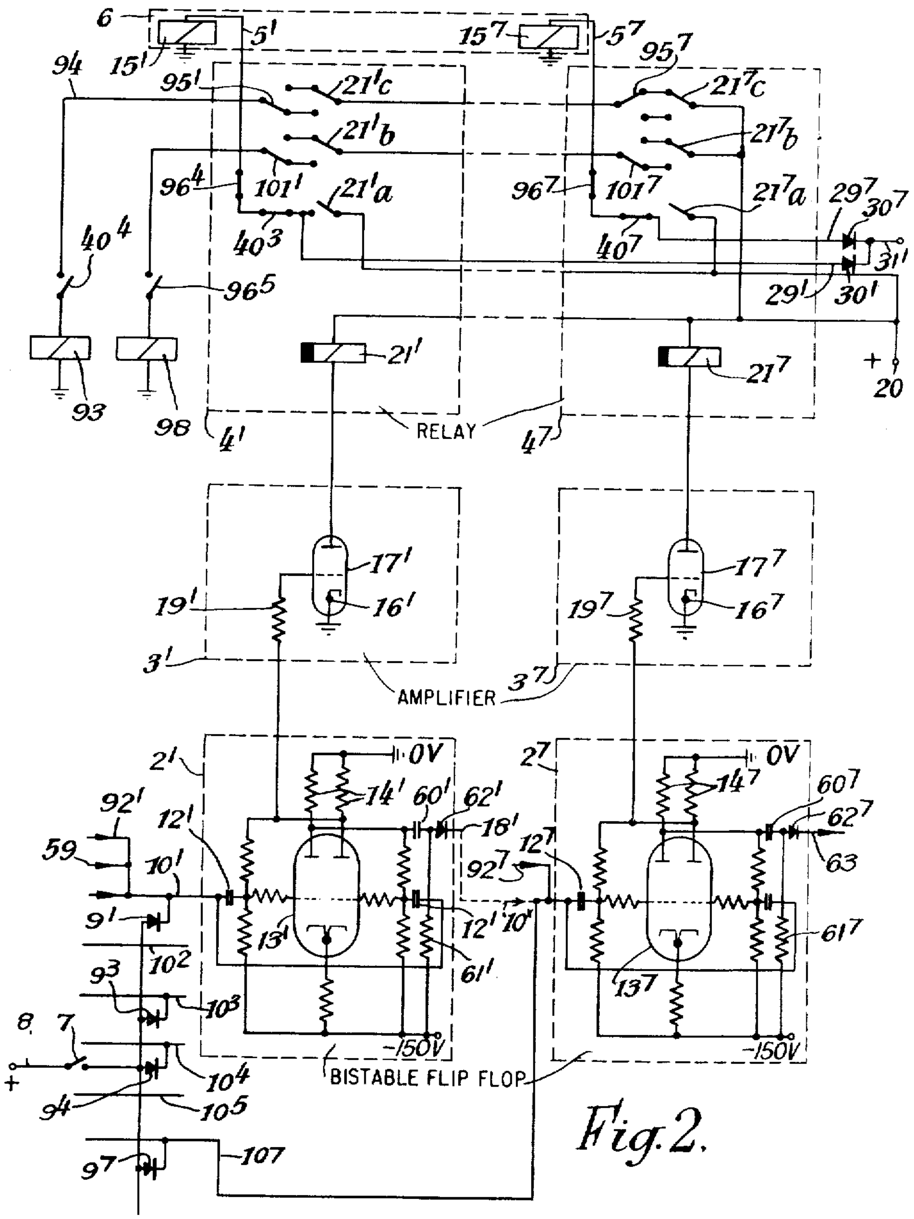

In order that the invention may be readily carried into effect, it will now be described with reference to the accompanying drawings, wherein:

FIG. 1 is a schematic diagram of an embodiment of a tape perforating device and the control circuits therefor of the present invention; and FIG. 2 is a detail circuit diagram of part of the control circuit of FIG. 1.

The invention will be described in relation to an arrangement for perforating a paper tape in accordance with characters entered by means of a keyboard. The character widths of the individual characters are counted concurrently with the perforating operation, and the related justification factor may be punched into the tape at the end of each line. The storage tape prepared in this way may be used subsequently in known manner to control a line composing machine, or a justifying typewriter, to produce lines of justified type.

In order to facilitate the understanding of the schematic drawings, certain symbols used to represent known circuit elements will be explained. Bi-stable flip-flops utilized in the control circuits are indicated by a box containing a representation of a step wave-form. These flip-flops employ a double triode in a conventional D.C. cross-coupled arrangement, with input signals applied individually to the control grids and control voltages taken from the anode circuits. A gate circuit is indicated by a box containing a triangle and a schematic switch. A monostable flip-flop is indicated by a box containing a single square pulse. A multi-vibrator is indicated by a box containing two square pulses.

The characters to be stored or recorded are entered by depression of the keys of a keyboard, indicated schematically at 1 (FIG. 1). The keyboard has a plurality of character and function control keys such as 7*a*, each of which, when depressed closes a contact such as 7. One side of each contact is connected to a positive supply line 8, and the other side of each contact is connected to the anode of one or more diodes 9. Thus the closure of the particular key contact 7 shown in FIG. 2 allows a positive potential to be applied e.g. to lines $10^1$, $10^3$, $10^4$ . . . $10^7$, through diodes $9^1$, $9^3$, $9^4$ . . . $9^7$, respectively. The key contacts for different characters are connected through diodes to the lines $10^1$ to $10^7$ in different combinations, corresponding to the code used for representing such characters when perforating the tape. One form of construction suitable for the keyboard 1 is disclosed in the United States Patent No. 2,665,336, issued to J. J. Saykay on Jan. 5, 1954.

The line $10^1$ is connected to the input of a bistable flip-flop $2^1$. The flip-flop $2^1$ consists of a double triode tube $13^1$ (FIG. 2) connected in a conventional cathode coupled flip-flop circuit. The voltage rise appearing on the line $10^1$ when the key contact 7 is closed is fed to both grids of the double triode $13^1$ via capacitors $12^1$. The normal state of the flip-flop $2^1$ is with the right hand triode (FIG. 2) conducting heavily and the left hand triode not conducting. The voltage rise at the grid of the right hand triode is severaly attenuated by the flow of grid current but the rise at the grid of the left hand triode is not so attenuated since this triode is initially non-conducting. However, the voltage rise is sufficient to cause it to conduct and the flip-flop then reverses its state in the usual manner so that the left hand triode is conducting heavily and the right hand triode is cut off. The lines $10^2$ to $10^7$ are similarly connected to individual bistable flip-flops $2^2$ to $2^7$, respectively.

The anodes of the double triode $13^1$ are connected through anode resistors $14^1$ to ground (FIG. 2). The control grid of a power triode $17^1$ in power supply unit $3^1$ is connected through a resistor $19^1$ to the anode of the right hande triode of the double triode $13^1$. Cathode $16^1$ of the power triode $17^1$ is connected to ground. Consequently, with the flip-flop $13^1$ in its normal state, that is with the right hand triode conducting heavily, the grid of the triode $17^1$ is held considerably negative with respect to ground and the triode $17^1$ is therefore non-conducting. However, when the state of the flip-flop $2^1$ is reversed the anode of the right hand triode rises to near ground potential and the triode $17^1$ is thereby allowed to conduct. The winding $21^1$ of a relay $4^1$ is connected between the anode of the triode $17^1$ and a positive supply terminal 20. The anode current of the triode $17^1$ energizes the relay winding $21^1$ which operates contacts $21^1a$, $21^1b$, and $21^1c$. The closure of contact $21^1a$ completes a circuit from the positive terminal 20 through contact $21^1a$ closed, contacts $40^3$ and $96^4$, in the positions shown, line 5' and the winding of a relay $15^1$ to ground. The relay $15^1$ forms part of a tape perforating and sensing unit 6 (FIG. 1) and controls the selection of one of the punches for punching a hole in tape 43. The flip-flop $2^7$ controls operation of a power triode $17^7$ which in turn controls energization of a relay $21^7$. Each of the other flip-flops $2^2$ to $2^6$ controls energization of respective punch selecting magnets.

A paper tape punching mechanism suitable for operation by the electromagnets $15^1$—$15^7$ is disclosed in detail in United States Patent No. 2,700,421 issued to E. O. Blodgett on January 25, 1955.

It will be appreciated however that other forms of construction in which tape punches are adapted to be selected under electromagnetic control may also be used.

The tape sensing unit is adapted to provide electrical outputs representing the perforations sensed in the tape 43. This may be achieved by employing mechanical feelers which operate electrical contacts in the manner disclosed in United States Patent No. 2,017,087, issued to J. J. Ackell on October 15, 1935, or for example by a photoelectric sensing arrangement such as that described in United States Patent No. 2,667,535 issued to R. D. Slayton on January 26, 1954.

It will be appreciated that operation of a key of keyboard 1 causes a reversal of state of one or more of the flip-flops $2^1$ to $2^7$ in accordance with the tape coding for the particular character represented by that key. The flip-flops 2, through the triodes 17 in power units 3 and the relays 21, respectively, effect energization of the corresponding punch selecting magnets 15 to prepare for punching the appropriate code into the tape 43.

At the same time as the punch selecting magnets 15 are being energized the character width appropriate to the particular character is being determined by a character width calculator, generally designated 26 in FIG. 1. The off-side of each of the contacts $21^1a$ to $21^7a$ is connected through diodes $30^1$ to $30^7$, respectively, to a line $31^1$. Thus a positive potential is transmitted to the line $31^1$ whenever any one of the contacts $21^1a$ to $21^7a$ is closed. This positive potential is applied to one grid of a bistable flip flop 31 to switch it on. One anode of the flip flop 31 is connected to a control input of a gate 32. The other input to the gate 32 is provided by a magnetic sensing head 33. The magnetic head 33 is positioned adjacent to the surface of a non-magnetic drum 27 which is mounted on a shaft 29 driven by an electric motor 30.

Magnetized insert 34 is mounted on the drum 27 in such a position that the insert passes close to the gap in the head 33 as the drum 27 rotates. Hence, once in each revolution of the drum 27 a signal is induced in the head 33 by the insert 34. If the gate 32 has been opened by the switching on of the flip flop 31 the signal induced in the head 33 is passed by the gate 32 to one input of a bistable flip flop 46 to switch this flip-flop on. One anode of the flip-flop 46 is connected to the control input of the gate 35. The other input of the gate 35 is provided by a magnetic sensing head 36 which is positioned to sense a plurality of magnetic inserts $37^1$ to $37^n$ arranged around the circumference of the drum 27.

Thus, whenever any one or more of the relays $4^1$ to $4^7$ is operated the flip flop 31 is switched on and gate 32 is opened thereby which allows the flip flop 46 to be switched on by the synchronizing signal generated by the magnetic insert 34 in the head 33. When the first magnetic insert $37^1$ passes beneath the head 36 a signal is induced in that head, which signal is passed by the gate 35 and is fed via a line 37 to the grid of a gas filled triode 38. The cathode of the triode 38 is connected to the winding of the punch operating magnet of the perforating unit 6 so that ionizing of the triode 38 causes energization of the punch magnet and a punching cycle occurs in which the punches selected for operation by the energized electromagnets 15 are caused to punch corresponding perforations in the tape 43. The cathode of the triode 38 is also connected via a resistor 45 to the grid of a gas triode 47. The grid of the triode 47 is connected to ground via a capacitor 48 which forms a time constant circuit with the resistor 45 to delay the rise of voltage at the grid of the triode 47 consequent to ionization of the triode 38. The winding 41 of a relay is connected in parallel with the winding of an electromagnet 51 and the two windings are connected in series with a capacitor 50 between a positive supply terminal 49 and the anode of the gas triode 47.

The triode 47 is normally held non-conducting by a negative potential applied to its grid through a resistor 22 from a negative supply terminal 23. When the grid potential of the triode 47 has risen sufficiently, due to the conduction of the triode 38, the triode 47 ionizes. The anode of the triode 47 charges the capacitor 50 and, in flowing through the relay winding 41 and electromagnet 51, energizes them. As the capacitor 50 charges, the anode voltage of the triode 47 falls and eventually reaches a level which is insufficient to maintain ionization and the triode is extinguished. After the triode 47 is extinguished the capacitor 50 discharges through a parallel resistor 44. The resistor 44 has a relatively high value and the current flowing through it is insufficient to maintain conduction of the triode 47.

Anode voltage is applied to the triode 38 from a positive supply terminal 39 through normally-closed contacts $40^5$ and $41^1$. Energization of the relay winding 41 by the triode 47 causes the contacts $41^1$ (shown remote from 41 for clarity's sake) to open thereby breaking the anode circuit of the triode 38 and making said triode non-conducting. This deenergizes the punch-operating magnet in the unit 6.

When the electromagnet 51 is energized it attracts an armature 52 and thereby releases an arm 53. The arm 53 is secured to a shaft 54 which carries a tape feeding roller 55. The shaft 54 may be rotated by a continuously running motor 57 through the action of a friction clutch 56. The shaft 54 is normally held stationary by engagement of the arm 53 with the armature 52 but the release of the arm 53 allows the shaft to rotate, so turning the roller 55. The triode 47 is made non-conductive before the shaft 54 has completed one revolution. Hence, the electromagnet 51 is deenergized and the armature 52 returns to its normal position to engage the arm 53 after the shaft 54 has completed one revolution. The diameter of the roller 55 is such that, in one revolution, it moves the tape 43 in arrow direction 58 a distance equal to that between adjacent perforating positions.

The speed of rotation of the drum 27 is such that all the inserts $37^1$ to $37^n$ are sensed by the head 36 before the relay winding 41 is deenergized, so that the gas triode 38 is ionized once only for each key depression.

The setting of the flip flops $2^1$ to $2^7$ is unique for each character code and these flip flops are used as a binary counting chain to provide an output pulse at a time indicative of the particular code combination which was stored in them.

Referring to FIG. 2 it will be seen that the left hand anode of the double triode $13^1$ is connected through a capacitor $60^1$ and a diode $62^1$ to a line $18^1$. The junction point between the capacitor and diode is connected through a resistor $61^1$ to a supply line at minus −150 volts. The line 18 is connected to the line $10^2$ (as indicated by $10^x$) which forms the input line for the flip flop $2^2$. Each of the flip flops $2^2$ to $2^6$ is provided with a similar connection of the output lines $18^2$—$18^6$, respectively, to the input lines $10^3$—$10^7$, respectively, to constitute a counting arrangement from each one to the next higher flip flop stage so that the flip flops $2^1$ to $2^7$ are adapted to act as a binary counting chain in the normal manner. The left hand anode of the double triode $13^7$ is connected through a capacitor $60^7$ and a diode $62^7$ to an output line 63 (see also FIG. 1). The pulses applied to the flip flops $2^1$ to $2^7$ by closure of a key contact 7 are of sufficient amplitude and duration to override pulses which may be transmitted to a flip flop through an interstage coupling on the previous flip flop. This ensures that the flip flop stages are set up individually under control of the key contacts and do not operate as a counter at this time.

Input pulses are applied to the flip flop stage $2^1$ from the gate 35 over a lead 59. The number of inserts 37 is equal to the counting capacity of the counter formed by the flip flop stages $2^1$ to $2^7$. Hence, whatever may be the setting of the flip flops $2^1$ to $2^7$ as a result of the setting by the key contacts, an output pulse will always be produced on the line 63 from the last stage $2^7$ by the input pulse fed to the counter over line 59.

However, the time at which this output pulse is produced in relation to the sensing of the first insert $37^1$ will depend upon this initial setting of the flip flop stages. The output pulse on the line 63 is produced when the continued application of the input pulses returns the counter to zero. The pulse on the line 63 is fed to the flip flops 31 and 46 to switch them off and thereby close the gates 32 and 35. Since the gate 35 is now closed no further input pulses are applied to the counter and the flip flop stages $2^1$—$2^7$ are left in the off condition. The pulse on the line 63 is also fed via a line $64^1$ to the input of a monostable flip flop 64. This pulse switches the flip flop on. One anode of the flip flop 64 is connected to the control inputs of the group of five gates $65^1$ to $65^5$. Signals are applied to these gates by five magnetic sensing heads $66^1$ to $66^5$, respectively. These heads are positioned adjacent the surface of a non-magnetic drum 28 which has 5 corresponding circumferential rows of magnetized inserts $67^1$, $68^1$, $69^1$, $70^1$ and $71^1$ etc. The drum 28 is mounted on the shaft 29 and therefore is rotated in synchronism with the drum 27. There is one group of inserts arranged parallel with the axis of the drum 28 associated with each of the inserts 37 on the drum 27 each associated insert 37 and group of inserts on 28 being in a common axial plane. Each group of inserts on the drum 28 represents a value in binary coded form.

When the flip flop 64 is switched on by the pulse on the line $64^1$ the gates $65^1$—$65^5$ are rendered operative to pass signals generated by the heads $66^1$—$66^5$. The output signals from the gates $65^1$—$65^5$ are fed individually to five flip flop stages $24^1$ to $24^5$, respectively. The flip flop stages $24^1$—$24^5$ are similarly arranged as the flip flop stages $2^1$ to $2^7$, so that they form a five-stage binary counter with provision for setting each stage individually. The monostable flip flop 64 relaxes after a time sufficient to allow the sensing of one group of inserts on the drum 28 by the heads $66^1$—$66^5$, so that the flip flop stages $24^1$ to $24^5$ are set in a pattern corresponding to the coded pattern of the group of inserts which was sensed.

A line $64^3$ is capacitatively coupled to one anode of the flip flop 64 and is connected to the input of a bistable flip flop 72. One anode of the flip flop 72 is connected by a line $72^3$ to the control input of a gate 73. A continuous train of pulses is applied to the gate 73 over a line $73^1$ by a free running multivibrator 74. The output of the gate 73 is connected by a line $73^2$ to the input of the amplifier 75 and also to the input of the first flip flop stage $24^1$.

In this way, a train of pulses is fed to the flip flop $24^1$, to be counted by the counter formed by the stages $24^1$ to $24^5$ as soon as these stages have been set in accordance with the pattern of inserts sensed by the heads $66^1$—$66^5$. The same train of pulses is fed by the amplifier 75 to the input of a further counter 76. When the counter formed by the stages $24^1$ to $24^5$ is returned to zero by the input pulses the last stage $24^5$ produces an output pulse on the line 77.

The line 77 is connected to the other input of the bistable flip flop 72 so that a pulse on this line switches the flip flop off. This closes the gate 73 and prevents any further pulses from being fed either to the stage $24^1$ or to the amplifier 75. Since the stages $24^1$ to $24^5$ operate as a five-stage binary counter it is apparent that the number of pulses fed to the amplifier 75 will be equal to the complement to 64 of the initial setting of the flip flop stages $24^1$ to $24^5$ which was produced by the gates $65^1$—$65^5$. For this reason each line of inserts $67^1$ to $71^1$ etc. is coded to represent the complement to 64 of the character width associated with one of the characters which may be recorded in the tape 43 under control of the keyboard 1. The selection of a particular group of inserts is determined by the time at which the output pulse occurs on the line 63. For example, if the coding of a particular character is such that the counter formed by the flip flop stages $2^1$ to $2^7$ produces an output pulse on the line 63 after three of the inserts $37^1$ to $37^3$ have been sensed, then the complement of the character width associated with that character will be represented by the group of inserts $67^3$ to $71^3$ which is axially aligned in a common plane with the third insert $37^3$.

From the foregoing description it will be understood that the setting of the flip flops $2^1$ to $2^7$ by a character-representing key $7^a$ will produce punching of a corresponding coded representation of the character in the tape 43, followed by operation of the feeding roller 55 to move the tape 43 to the next perforating position. Simultaneously with this punching and feeding operation the character width storage device formed by the drum 28 and its inserts controls entry of a number of pulses into the counter 76 equal to the number of units of character width associated with the character punched in the tape. It will be apparent that a similar sequence of events takes place each time one of the character keys 7*a* is depressed.

Preferably the counter 76 comprises a number of stages each of which consists of a multicathode gas discharge counting tube, such as, for example, a Dekatron. The position of the discharge in these tubes will provide a visual indication of the amount registered by the counter. The operator of the machine is thus enabled to see how many units of character width are represented by the characters which have been recorded on the tape. The tape 43 may be used subsequently to control a type-setting or line-composing machine. When the operator sees that the total of character widths recorded by the counter 76 is sufficient to produce a line of justified type on the type setting machine he depresses an "end of line" key 103 in the keyboard 1. This causes closure of a contact 103*a* and sets up the flips flops $2^1$ to $2^7$ to control punching of an end-of-line code perforation in the tape 43.

The key 103 also closes the contact 103*b* (shown remote thereof for clarity's sake) which connects a potential supply terminal 94 to the counter 76. The application of this potential to the counter 76 resets it to zero in preparation for counting the character widths associated with the next line.

If during the recording of a line of characters the operator discovers that an incorrect character has been recorded, he depresses a back-space key 105 (FIG. 1) repeatedly to bring the recording on the tape of the incorrect character back to the punching position. Depression of the key 105 closes a contact 105*a* which connects an input of a monostable flip flop 108 to a positive supply terminal 106 via a capacitor 107. Consequently, closure of the contact 105*a* produces a pulse which switches on the flip flop 108. One anode of the flip flop 108 is connected to the control grid of a power triode 109 in a manner similar to the connection of the power triode $17^1$ to the flip flop $2^1$ of FIG. 2.

When the flip flop 108 is switched on the triode 109 conducts and energizes an electromagnet 84 the winding of which is connected between that anode and a positive supply terminal 87. The electromagnet 84 attracts an armature 83 and thereby releases an arm 82 which is secured to a shaft 79. The shaft 79 carries a tape feed roller 78, and may be driven through the friction clutch 80 by a motor 81. It will be appreciated that this feeding arrangement is similar to that used for driving the roller 55. However, the roller 78 is driven in the opposite direction to the roller 55. The flip flop 108 relaxes after a short time so that the shaft 79 makes only one revolution for each depression of the key 105. The roller 78 is of the same diameter as the roller 55 so that, for each revolution, it feeds the tape 43 a distance equal to that between adjacent perforation positions, but in the reverse direction to the arrow 58.

When the incorrectly punched or recorded character has been positioned beneath the punches the operator depresses an "erased" key 104 in the keyboard 1. This closes contact 104*a* which sets up the flip flops 2 in the usual manner. Preferably the "erased" code consists of perforations in all seven punch positions for the tape. In this case the counter formed by the flip flops $2^1$ to $2^7$ is set to its full counting capacity and the output pulse on the line 63 is produced when the insert $37^1$ is sensed by the head 36. It will be seen that no inserts are present on the drum 28 on the axial line in the same plane as the insert $37^1$ so that the depression of the "erased" key causes no entry into the counter 76.

The gas triode 38 is ionized in the same manner as that already described but, with the erased key depressed, contact 104*b* in the cathode line $38^1$ is shifted and the positive potential of the cathode of the triode 38 is not applied to the gas triode 47. Instead, this potential is applied through a resistor 111 to the input of a bistable flip flop 113. A capacitor 112, connected from the input of the flip flop 113 to ground, provides a delay in the rise of voltage. One anode of the flip flop 113 is connected to the grid of the triode 109 so that when said flip flop is switched by the rise of voltage consequent to the ionization of the gas triode 38 the triode 109 is made conductive. As before, the triode 109 energizes the electromagnet 84 to allow the roller 78 to be driven. However, the bistable flip flop 113 remains in its switched condition so that the electromagnet 84 is continuously energized and the roller 78 drives the tape continuously.

The positive voltage at the cathode of the triode 38 is always applied to the one winding 40*a* of a multi-contact relay 40 to energize it. This causes closure of the contact $40^1$ which completes a circuit from positive supply terminal 90 through contact $93^1$ normally closed, contact $40^1$ shifted, to the other winding 40*b* of the relay 40. This provides a holding circuit for the relay 40. Contact $40^5$ (shown remote for clarity's sake) opens in the anode circuit of the gas triode 38 and makes it non-conducting. Contact $40^2$ (also shown remote) closes to connect a positive supply terminal 91 to the sensing device forming part of the unit 6.

For sensing, in the correction procedure, the records made on a punched tape 43, the individual sensing elements in the unit 6 are connected by a multi-line cable $92^{1-7}$ to the inputs of the flip flops $2^1$ to $2^7$, respectively, see FIGS. 1 and 2. Hence the flip flops $2^1$ to $2^7$ will be set up in response to the character combinations sensed during movement of the tape 43 successively therefrom by the unit 6, in the same way as though these characters had been entered successively by means of the keyboard 1. The circuit will operate in the manner already described except that the triode 38 will not be made conductive since the contact $40^5$ (shown remote for clarity's sake) remains open and the punch selector magnets in unit 6 will not be operated since the exciting circuit to them is broken by opening of the contacts $40^3$ to $40^7$, respectively, (shown in FIGS. 1 and 2) in the units $4^1$ to $4^7$. The counter 76 will also receive the pulses in the manner described previously, but this is immaterial since the counter will be reset in a manner to be described. If desired the connection between the output of the amplifier 75 and the input of the counter 76 may be broken by a further contact of the relay 40.

Each of the units $4^1$ to $4^7$ is provided with a manually settable switch $95^1$ to $95^7$, respectively. These switches are preset in such positions that when the particular combination of relays $21^1$ to $21^7$ is energized which corresponds to the sensing by the unit 6 of the end-of-line signals, a circuit is completed from the positive terminal 20 through the various contacts $21^1c$ to $21^7c$ and associated switches $95^1$ to $95^7$, respectively, the line 94, contact $40^4$ now closed, to the winding 93 of a multi-contact relay. Hence the relay winding 93 is energized only when the end-of-line signal is sensed, which precedes the line in which the correction is to be made.

Contact $93^8$ (shown remote for clarity's sake) closes to complete a circuit from the positive terminal 106 (FIG. 1) via a capacitor 114 to the other input of the flip flop 113 to switch it off. This renders the triode 109 non-conducting and arrests the reverse feeding of the tape 43. Contact $93^1$ (also shown remote) opens and breaks the holding circuit for the relay 40 thus deenergizing it. The contact $93^2$ (also shown remote) closes to apply the potential from the terminal 94 to the counter 76 and thereby reset it in a manner similar to that already described. Contact $93^3$ (also shown remote) closes and completes a circuit from positive terminal 95 through winding $96^a$ of a double-winding multi-contact relay 96 to ground. This energizes the relay 96 which closes contact $96^1$ to complete a holding circuit from positive supply terminal 97 through a normally closed contact $98^1$ the contact $96^1$ shifted, and winding $96^b$ of the relay 96. Contact $96^2$ (also shown remote) closes to apply once again a voltage from the positive terminal 91 to the sensing devices in the unit 6. Contact $96^6$ (also shown remote) is shifted to break a connection from the cathode of the gas triode 38 to the punch-operating magnets in unit 6 and to connect the cathode instead through a resistor 115 to ground.

Since the flip flop 113 is switched off, as stated above, when the contact $93^8$ (also shown remote) closes, the tape 43 will come to rest with the character recording preceding the end-of-line signal in the sensing position. When contact $93^8$ closes, contact $93^9$ (also shown remote) also closes and connects the grid of the tube 47 to the positive terminal 49 via a capacitor 116. The grid voltage of the triode 47 starts to rise and the triode ionizes to energize the electromagnet 51. Thus, immediately after the tape comes to rest the roller 55 starts to revolve and drives the tape in the direction of the arrow 58. By the time the relay 96 has been energized and has closed the contact $96^2$, the end-of-line signal is positioned for sensing. This sets up the flip flops $2^1$ to $2^7$ and leads to operation of the gas triode 38 in the usual manner. Since the contact $96^6$ has been shifted a punch operating magnet of the unit 6 is not energized. However, the potential drop across the resistor 115 is applied to the grid of the gas triode 47 causing it to ionize and feed the tape 43 another step. Since the end-of-line signal is not a character, no inserts are sensed by the heads 66 at the time that the output pulse occurs on the line 63 after the setting up of the flip flops $2^1$ to $2^7$ by the end-of-line signal. The punch selector magnets in unit 6 are also prevented from operating since contacts $96^4$ and $96^7$ and analogous contacts in the other units $4^1$ to $4^7$, respectively, are open.

When the first character recording after the end-of-line signal is sensed, the flip flops $2^1$ to $2^7$ will be set up in the usual manner and will cause entry of the corresponding character width into the counter 76. The gas triode 38 will be ionized once more causing a further feed of the tape to take place. In this manner the recorded characters will be sensed in turn and the corresponding characters widths will be entered into the counter 76.

Each of the units $4^1$ to $4^7$ is provided with a manually settable switch $101^1$ to $101^7$, respectively. These switches are set in such positions that when the relay coils $21^1$ to $21^7$ are energized in response to the sensing of the erased code a circuit is completed from the positive terminal 20 through the contacts $21^1b$ to $21^7b$ respectively the associated switches $101^1$ to $101^7$, respectively, through the contact $96^5$ (also shown remote) which is now closed, to the relay winding 98. Hence the relay winding 98 is energized when the incorrectly recorded character which was previously indicated by over-punching with the "erased" code is sensed. The relay winding 98 on being energized opens contact $98^1$ (shown remote in FIG. 1) to break the holding circuit for the relay 96 which is therefore deenergized. All the relays which were energized during the process of the correction cycle have now been deenergized so that the circuits are once more in a condition for operation by the keyboard 1 in the normal manner. All the characters recorded in the tape between the last end-of-line signal and the incorrect character were sensed successively during the correction operation so that the counter 76 now registers the correct representation of the character widths for these characters. The characters following the incorrect character are over-punched with the "erased" code by depressing the "erased" key 104 and simultaneously depressing the cancel key 110. Depression of the "erased" key 104 causes punching of the erased code in the manner previously described. However, the cathode of the triode 38 is connected through the contact 104*b* (also shown remote) shifted by key 104 and the shifted contact 110*a* controlled by the key to the grid of the triode 47 so that the tape is fed one step in the direction of the arrow 58. When all the characters have been over-punched with the "erased" code, recording of the required characters is resumed by operation of the keyboard 1.

In the embodiment described, the counter 76 is reset during the correcting operation and the character widths of the correctly recorded characters are re-entered under control of the sensing device. Alternatively, the character widths of the incorrect character and any following character may be subtracted from the registered count. An erase code is punched following the last recorded character. The tape is then back spaced step by step to bring the incorrect character to the sensing position. A modified circuit is provided for the erase key, which circuit causes the tape feed to drive the tape continuously in the direction of the arrow 58. The sensing device is operative for this direction in the manner already described, except that the contacts of a relay are used to changeover the connections between the gates $65^1$—$65^5$ and the flip-flops $24^1$ to $24^5$. These contacts cause the flip-flops $24^1$ to $24^5$ to be set to the complement of the value sensed by the heads $66^1$ to $66^5$, respectively, so that the character widths are subtracted. Instead, the counter may itself be operated so that it subtracts applied pulses from the registered count. As before, the correcting operation is terminated by the sensing of the "erased" code. The "erased" code may be overpunched during the correcting operation over the incorrect character and following characters.

The multivibrator 74 and the monostable flip-flops 64 and 108 are of conventional design. Suitable circuits are described, for example, in the book "Waveforms" by Chance et al., published by McGraw Hill. The gates, such as 32 and $65^1$ to $65^5$, may conveniently be pentodes with the signals applied to the control grid and the control voltage applied to the suppressor grid.

It will be appreciated that a magnetic tape may be used instead of the punched paper tape, by replacing the punching and sensing mechanism by magnetic recording and reading heads.

The tape feeding mechanism utilizing the friction rollers 55 and 78 is intended as a diagrammatic illustration of one possible form of feed. It will be appreciated that each roller may be replaced by a sprocket engaging feed holes punched in the tape. Each sprocket is provided with a simple reversible ratchet mechanism which allows it to rotate freely in the direction opposite to that in which it transmits drive to the tape. Thus one sprocket does not impede the movement of the tape when it is being fed by the other sprocket. Alternatively, the tape may be clear of the rollers 55 and 78 in the normal position. The rollers are continuously driven and the electromagnets 51 and 84 each control movement of an idler roller to a position in which the tape is gripped between the roller 55 or the roller 78 and the respective idler roller.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention, and, therefore, such adaptations should and are intended to be comprehended within the meaning and range of equivalence of the following claims.

What I claim is:

1. In apparatus for sequentially recording signals representing data items in groups separated by recorded marker signals, with provision for cancelling the recording of an incorrectly entered data item and any following data items of the same groups, in combination, generating means for generating control signals respectively correlated with recorded data items as the respective data items are recorded; storage means for registering said control signals; indicating means for indicating a recorded data item which is to be cancelled; sensing means for sequentially sensing the recorded data items and marker signals; reset means for resetting said storage means as each marker signal is sensed; control means for rendering said generating means operative in response to the sensing of data items; and terminating means for terminating said sequential sensing on detection of the indicated data item and for causing said storage means to register the corresponding control signal whereby the registration of the storage means is corrected to correspond to data items recorded prior to the indicated data item.

2. In apparatus for sequentially recording signals representing data items on a record medium in groups separated by recorded marker signals, with provision for cancelling the recording of an incorrectly entered data item and any following data items recorded in the same group, in combination, generating means for generating control signals respectively correlated with recorded data items as the respective data items are recorded; storage means for registering said control signals; indicating means for indicating a recorded data item which is to be cancelled; sensing means for sequentially sensing the recorded data items; first control means for initiating a first sensing of the data items in a reverse sequence opposite to the sequence in which said data items are recorded; second control means responsive to detection of a marker signal for terminating said first sensing and for initiating a second sensing of the data items in the sequence in which said data items are recorded; third control means for detecting the indicated data item and for terminating said second sensing; fourth control means for rendering said generating means operative in response to data items sensed during said second sensing; and reset means for resetting said storage means prior to said second sensing.

3. Apparatus as claimed in claim 2, further comprising a counter, means for registering a data item to be recorded in coded form in said counter and; means for applying a train of pulses to the counter in synchronism with the operation of said generating means to generate an output pulse from the counter at a time representative of the registered data item.

4. Apparatus as claimed in claim 3, wherein said generating means comprises a continuously operating cyclic device and in which means are provided for detecting registration of a data item by the counter, which means are operative to apply said train of pulses to the counter at a fixed time in the cycle of the signal generating means, each time a data item is registered by the counter.

5. Apparatus as claimed in claim 4, wherein said generating means includes a continuously rotating non-magnetic drum with magnetic inserts positioned on the circumference in code representing groups and a plurality of magnetic heads adapted to have pulses induced therein by the inserts.

6. Apparatus as claimed in claim 5, wherein said drum is provided with a single insert and an associated magnetic head adapted to have a pulse induced therein for each revolution of the drum.

7. Apparatus as claimed in claim 6, wherein said drum carries a plurality of inserts adapted to generate in an associated magnetic head a train of pulses for application to the counter.

8. Apparatus as claimed in claim 7, further comprising a first gate which is rendered operative by the registration of a data item in the counter; means for applying each pulse per revolution to said first gate; a second gate; means for applying the output of said first gate to said second gate to render the said second gate operative to pass said train of pulses to the counter; and means for applying the output pulse from said counter to said first and second gates, the output pulse from the counter being effective to render inoperate both the first and the second gates.

9. Apparatus as claimed in claim 5 wherein said storage means comprises a second counter and further comprising means for controlling the entry of signals from said generating means into a second counter under the control of the output pulse from said first-mentioned counter.

10. Apparatus as claimed in claim 9, further comprising a third counter; and means for setting said third counter under control of said generating means and for applying a train of pulses to said second and third counters under the control of the output pulse from said first-mentioned counter.

11. Apparatus as claimed in claim 10, wherein said third counter generates an output pulse at a time dependent upon the setting thereof and in which such output pulse is effective to terminate the application of pulses to both the second and third counters.

12. Apparatus as claimed in claim 2, further comprising feeding means for feeding said record medium past a sensing and recording position in a step by step manner said feeding means including first feeding means for feeding said record medium one step; and means for causing operation of said first feeding means to feed said record medium one step under the control of the entry of a data item to be recorded.

13. Apparatus as claimed in claim 12, wherein said feeding means further includes second feeding means adapted to be rendered operative selectively to feed said record medium in the opposite direction to the first feeding means.

14. Apparatus as claimed in claim 13, wherein said second feeding means is adapted to be rendered operative to feed said record medium in a continuous manner.

15. Apparatus as claimed in claim 14, further comprising a manually operated erase key adapted to control recording of an erase code on said record medium and to render said second feeding means operative to feed the said record medium in a continuous manner.

16. In apparatus for recording character representing data in groups separated by recorded marker signals, with provision for cancelling the recording of incorrectly entered character representing data and any following character representing data of the same group, in combination, encoding means for encoding recorded character representing data as each respective character representing data is recorded and for providing encoded character representing signals; first storage means for registering said encoded character representing signals; second storage means for signals representing the character widths of the characters represented by said encoded character representing signals; control means for selecting character widths from said second storage means under the control of said encoded character representing signals and corresponding to the encoded recorded characters; indicating means for indicating recorded character representing data which is to be cancelled; sensing means for sequentially sensing recorded character representing data and marker signals; control means for rendering said encoding means operative in response to the sensing of character representing data; and terminating means for terminating said sequential sensing on detection of the indicated character representing data, and for causing said first storage means to register the corresponding encoded character representing signals and for causing the selection of the corresponding character width signal from said second storage means under the control of said encoded character representing signals whereby the registration of the first storage means is corrected to correspond to character representing data recorded prior to the indicated character representing data and the corresponding character width of said indicated character representing data is indicated.

17. In apparatus for recording character representing data in groups separated by recorded marker signals, with provision for cancelling the recording of incorrectly entered character representing data and any following character representing data of the same group, in combination, encoding means for encoding recorded character representing data as each respective character representing data is recorded and for providing encoded character representing signals; first storage means for registering said encoded character representing signals; second storage means for signals representing the character widths of the characters represented by said encoded character representing signals; time control means for selecting character widths from said second storage means under the control of said encoded character representing signals and corresponding to the encoded recorded characters, the timing of said time control means being controlled by the said encoded character representing signals; indicating means for indicating recorded character representing data which is to be cancelled; sensing means for sequentially sensing recorded character representing data and marker signals; control means for rendering said encoding means operative in response to the sensing of character representing data; and terminating means for terminating said sequential sensing on detection of the indicated character representing data, and for causing said first storage means to register the corresponding encoded character representing signals and for causing the selection of the corresponding character width signal from said second storage means under the control of said encoded character representing signals whereby the registration of the first storage means is corrected to correspond to character representing data recorded prior to the indicated character representing data and the corresponding character width of said indicated character representing data is indicated.

References Cited in the file of this patent

UNITED STATES PATENTS

| | | |
|---|---|---|
| 2,689,950 | Bayliss et al. | Sept. 21, 1954 |
| 2,765,895 | Higonnet et al. | Oct. 9, 1956 |